United States Patent [19]

Kaneda

[11] 3,758,818

[45] Sept. 11, 1973

[54] STARTING CIRCUIT FOR DISCHARGE LAMPS

[75] Inventor: Isao Kaneda, Otsu, Japan

[73] Assignee: New Nippon Electric Co. Ltd., Osaka, Japan

[22] Filed: July 23, 1970

[21] Appl. No.: 57,529

[30] Foreign Application Priority Data

July 25, 1969 Japan ................................ 44/59243

[52] U.S. Cl. .................. 315/207, 315/240, 315/244, 315/290, 315/356, 315/DIG. 7

[51] Int. Cl. ............................................ H05b 41/14

[58] Field of Search .................. 315/DIG. 5, DIG. 7, 315/101, 207, 227, 239, 240, 242, 244, 290, 356

[56] References Cited

UNITED STATES PATENTS

| | | | |
|---|---|---|---|
| 3,476,976 | 11/1969 | Morita et al. | 315/101 |
| 3,522,475 | 8/1970 | Hashimoto | 315/240 X |
| 3,383,558 | 5/1968 | Waymouth | 315/242 |
| 3,235,769 | 2/1966 | Wattenbach | 315/DIG. 7 |

*Primary Examiner*—Roy Lake
*Assistant Examiner*—Siegfried H. Grimm
*Attorney*—Posnack, Roberts and Cohen

[57] ABSTRACT

A circuit is provided for operating a cold-cathode discharge lamp which includes first and second closed circuits which share in common a capacitor. The first closed circuit includes a power source and an inductive stabilizer in combination with the aforesaid capacitor and the second closed circuit includes an inductor and a bidirectional diode thyristor in combination with the capacitor. A second bidirectional diode thyristor is provided which constitutes with the second closed circuit a starting circuit for the discharge lamp. The second thyristor has a lower break-over voltage than the first thyristor. The second closed circuit is such that the capacitor is charged through the second said bidirectional diode thyristor to the instantaneous value of the power source and is discharged by the first said bidirectional diode thyristor through the inductor to produce a high voltage which is applied to the lamp to ignite the same.

6 Claims, 20 Drawing Figures

INVENTOR.
ISAO KANEDA

BY

Posnack, Roberts + Cohen
ATTORNEYS

INVENTOR.
ISAO KANEDA

BY

Posnack, Roberts + Cohen
ATTORNEYS

INVENTOR.
ISAO KANEDA
BY
Posnack, Roberts & Cohen
ATTORNEYS

INVENTOR.
ISAO KANEDA

BY

Posnack, Roberts & Cohen
ATTORNEYS

STARTING CIRCUIT FOR DISCHARGE LAMPS

BACKGROUND FIELD OF INVENTION

This invention relates to starting circuits which employ thyristors or the like and which are applicable to cold-cathode type discharge lamps, and more particularly to starting circuits which are suitable for high-pressure vapor discharge lamps and which provide an assured starting of such lamps and prevent unwanted extinction during normal operation.

PRIOR ART

Generally, for starting a high-pressure discharge lamp, a higher voltage than that required for the normal operation thereof is necessary. As is known, for the ignition of such a lamp in association with a commercial power line, the desired starting voltage can be obtained from a voltage stepping-up device such as a leakage-transformer which is operated as a stabilizer. However, in the case of cold-cathode type discharge lamps such as an extra-high-pressure discharge lamp, a high-pressure discharge lamp of the sodium vapor type, metal-halide vapor type or the like (all having high efficiency and/or a good color generation), a starting voltage which is relatively even higher and can be derived from a simple starting circuit is required.

When the starting voltage is substantially higher than the operational voltage of the discharge lamp, the voltage stepping-up device required is a much larger leakage transformer then might otherwise be necessary, rendering the whole assembly uneconomical and inefficient. Moreover, reliability with respect to starting of the lamp might be reduced. For this reason, it is desired that the starting voltage of the lamp be made lower by appropriate steps in lamp production and, at same time, it is also desirable that a starting circuit device which is an improvement over that previously available be provided at least from the view point of reliability in operation. Further, a starting circuit is desired which is compact and can start all types of cold-cathode discharge lamps while employing a conventional stabilizer.

SUMMARY OF INVENTION

A primary object of the present invention is to provide an improved starting circuit device which can be employed for cold-cathode discharge lamps and more particularly for high-pressure discharge lamps.

Another object of the present invention is to provide an improved starting circuit utilizing a high pulse or oscillation voltage generated by a non-linear circuit including a first thyristor.

Still another object of the invention is to provide an improved starting circuit which utilizes the energy storing effect and voltage stepping-up effect of a circuit including a second thyristor and which operates the aforesaid non-linear circuit at a voltage stepped-up approximately two times and which further supplies a starting current obtained by the energy storing effect for improving the reliability of starting of the associated lamp.

Still another object of the invention is to provide an improved starting circuit employing a band-pass filter in such a way that the unwanted extinction of the associated lamp during its operation is prevented.

According to the present invention, there is provided a starting circuit for a discharge lamp which utilizes a high pulse voltage or an oscillation voltage induced by a non-linear circuit which is characterized by the inclusion of a closed circuit having at least one thyristor, an inductor and a capacitor. This non-linear circuit is composed essentially of a first closed circuit formed by a power source, a stabilizer (including inductance $L_1$) and a capacitor (including a capacitance C), and of a second closed circuit formed by the above-mentioned capacitor, a second inductor (including an inductance $L_2$) and a thyristor preferably of the bi-directional diode or SSS type.

In the above-described arrangement, the first closed circuit is set for an oscillating condition, and the second closed circuit is set for an oscillating condition or non-oscillating condition depending on whether the voltage to be obtained is to be in oscillation or pulse form.

In these cases, the circuit elements are selected to satisfy the following conditions:

Namely, the oscillating voltage is obtained when $(R_2^2/4L_2^2) - (1/CL_2)$ is below zero while keeping $(R_1^2/4L_1^2) - (1/CL_1)$ below zero, and the pulse voltage is obtained when $(R_2^2/4L_2^2) - (1/CL_2)$ is above zero while keeping $(R_1^2/4L_1^2) - (1/CL_1)$ below zero, wherein:

$R_1$ = resistance in the first closed circuit
$L_1$ = inductance in the first closed circuit
$R_2$ = resistance in the second closed circuit
$L_2$ = inductance in the second closed circuit
$C$ = capacitance in the closed circuits Such a non-linear circuit arrangement is shown in the copending application of Sumi et al., Ser. No. 14,324 filed Feb. 26, 1970, which is assigned to the same assignee and which is now Pat. No. 3,636,374.

The operation of the oscillation circuit for obtaining high voltage is as follows.

The oscillating period of the second closed circuit is set to be shorter than that of the first closed circuit, and the inductance $L_2$ in the second closed circuit is a non-linear inductance coil composed of a ferrite core with coil windings. In this circuit, a current of comparatively long period is initially passed through the first closed circuit and capacitor C is thereby charged. Then, the thyristor becomes conductive, and a discharge current flows through the second closed circuit. This current reaches a considerable value when the non-linear inductance $L_2$ is driven to the saturation region, the value being higher than the instantaneous current value flowing through the first closed circuit. During this time, the terminal voltage of the capacitor C has its polarity reversed. After the completion of the discharge, the thyristor is brought into off state, but a back-swing voltage appears on the non-linear inductance $L_2$ depending on the relationship of the high-frequency loss and the distributed capacitance of the inductance $L_2$. This back-swing voltage causes an oscillation in the second closed circuit, and a difference voltage between the terminal voltage of the inductance $L_2$ and the terminal voltage of the capacitor C is applied to the thyristor. Thus, the terminal voltage of the capacitor C is brought to a higher value than the instantaneous voltage of the power source and the operational voltage or breakover voltage $V_{bo}$ of the thyristor. In this case, it is seen that the terminal voltage of the capacitor C is made higher when the charging voltage of the capacitor C nears the value of the back-swing voltage.

On the other hand, the operation of the non-oscillation circuit when the pulse voltage is generated is as follows. In this case, a square hysteresis magnetic material is employed as the core of an inductance coil for inductance $L_2$. As a result, the residual magnetism $+Br$ on the B-H curve of the core is obtained with a positive half-cycle of the current, and in the initial part of the next half-cycle of the current, and in the initial part of the off state and the capacitor is charged. At the instant when the thyristor is again brought back to the on state, the magnetic core of the inductance coil for the inductance $L_2$ is substantially changed in its magnetic flux from the $-Br$ state to a saturation level of magnetic flux density $B_s$ near $-Br$ on the B-H curve, so that the instantaneous inductance of $L_2$ is made very substantially larger and a single pulse of extremely high magnitude is thereby created.

According to the invention, a second thyristor or voltage responsive switching element, an inductance L and a capacitance C selected to be in resonance condition are further provided in the starting circuit, and the energy storage effect and the voltage stepping-up effect of such circuit is utilized. This additional circuit improves the reliability of the starting of the associated discharge lamp.

The voltage stepping-up effect in this circuit is believed to be obtained as follows: Since the thyristor has usually two break-over voltages $V_{bo1}$ and $B_{bo2}$ (one for each direction), the values of which are slightly different from each other, the capacitor may be gradually charged to the side of the higher break-over voltage (either $V_{bo1}$ or $V_{bo2}$) by a certain polarity of the a. c. source. The voltage caused by the charging of the capacitor is superposed on the power source voltage on the line. the superposed voltage has an asymmetrical wave-form so that the conducting duration of the thyristor is different for each direction due to the change of the charging level of the capacitor, whereby the voltage across the capacitor may be raised. Theoretically, the voltage is raised up to twice the power source voltage. Herein, if the circuit elements L and C are selected to be resonating, the charging speed is made faster. Thus, the voltage raised to about twice the power source voltage is employed as a voltage source for the non-linear circuit, which operates the second closed circuit, and as a result a starting voltage of impulse or oscillatory nature and of a very much higher value can be obtained. When this circuit is used for the starting circuit, the operational voltage of the first thyristor employed in the second closed circuit can be set to a higher value, because of using the second thyristor. As a result, the unwanted extinction of the lamp caused by erroneous operation of the starting circuit, which is caused by an instantaneous peak voltage generated occasionally during lamp operation, can be prevented.

In accordance with the present invention, the unwanted extinction of a lamp can also be prevented by the addition of a band-pass filter circuit. The reason for this resides in the fact that unwanted extinction of the lamp may also be caused by the voltage variation factor *dv/dt*. The band-pass filter is composed of L and C. A distributed capacitance of the inductor L may be used as C. More specifically, a known band-pass filter such as an L type, πtype of T type circuit can be added to the starting circuit of this invention whereby the last described object can be achieved.

The above-described basic three circuits can be employed in combination with various operating systems for discharge lamps such as of the leading-phase type, lagging-phase type, low-power-factor type, high-power-factor type, single-choke type, leakage-transformer type, constant-power type, or the like.

An advantageous feature of the present invention is that it reduces the cost of ignition apparatus substantially (to approximately one-third of the usual cost). This is accomplished by combining the starting circuit of this invention, for instance, with the single choke type used for metal-halide lamps. Another advantageous feature of the invention is, as noted above, the elimination of the unwanted extinction of lamps during operation, as a result of which the reliability of the ignition of lamps is improved. Furthermore, the starting circuit of the present invention is of small size and can be produced economically.

The nature, principle, and utility of the present invention will be more clearly understood from the following description of preferred embodiments thereof taken in conjunction with the accompanying drawings.

DETAILED DESCRIPTION

Figure 1A:
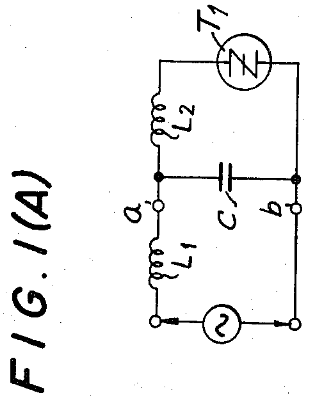
FIGS. 1(A), (B) and (C) are schematic diagrams showing basic circuits employed in accordance with the present invention.
Figure 1B:
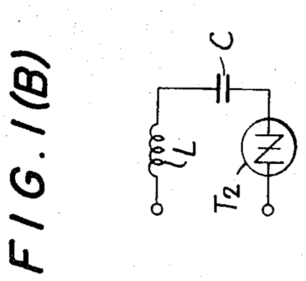
Figure 1C:
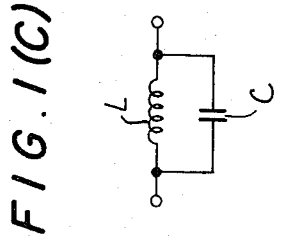

A non-linear circuit is illustrated in FIG. 1(A) wherein a voltage responsive switching element or thyristor $T_1$ is used for creating a pulse or oscillation voltage between terminals *a* and *b*. FIG. 1(B) is a circuit adapted to this invention to utilize a voltage stepping-up effect and an energy storaging effect in which a second thyristor $T_2$ is used together with series connected elements including capacitor C and inductor L. FIG. 1(C) is a simplified band-pass filter circuit. This filter circuit may otherwise be constituted by circuits of the L-type, $\pi$-type or T-type with respect to connection of the L and C elements.

Figure 2A:
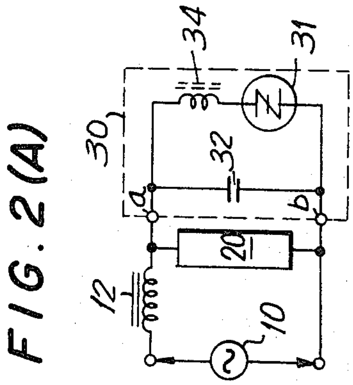
FIGS. 2(A), (B) and (C) are schematic diagrams of the basic circuit and modifications thereof for operating and starting a discharge lamp, in which either an oscillation or pulse signal is imployed.
Figure 2B:
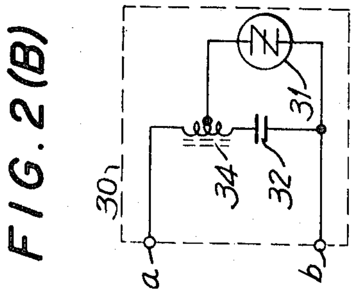
Figure 2C:
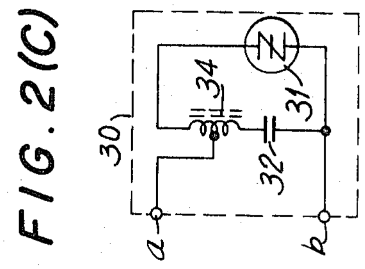

Simplified embodiments of the starting circuit of this invention are illustrated in FIGS. 2(A), (B) and (C), in which each of the circuits comprises a power source 10, a choke coil 12 for stabilizing arc discharge, a discharge lamp 20 such as of the cold-cathode type, and a starting circuit 30 of this invention. The starting circuit 30 includes a thyristor 31, a capacitor 32 and an inductance element 34 such as a saturable reactor. The element 34 usually includes a high frequency coil, and it is preferred to use a transformer, as shown in FIG. 2(B), for obtaining high-voltage pulses. However, it is also possible to use a coil, as the element 34 in FIGS. 2(B) and (C), which is separated completely into two parts at by a tap without the sections reacting with each other.

In the above arrangements, for example in FIG. 2(B), when the closed circuit included in the starting circuit 30 is set for a non-oscillating condition by the use of a high-frequency transformer, as the inductance element 34, whose magnetic core has a square hysteresis characteristic, the capacitor 32 is charged in response to the instantaneous voltage of the power source 10 connected thereto. When the voltage across the capacitor 32 reaches the value at which the thyristor 31 becomes operative, the thyristor 31 turns on, and the capacitor 32 releases its charge rapidly by way of the loop including the capacitor 32, the primary winding of the transformer or the coil 34 and thyristor 31. As a result, a high pulse voltage is induced in the coil 34 and is applied to the discharge lamp 20. When the pulse voltage becomes high enough, the discharge lamp 20 will turn on or ignite.

Since th closed circuit is not in oscillating state under these conditions, the number of pulses during a half-cycle of the power source voltage may be in the nature of a one-shot pulse or there can be provision for more pulses by suitably determining the values of the choke coil 12, the high-frequency coil 34 and the capacitor 32. To obtain one pulse in a half-cycle, it is preferred to use magnetic material such as a 50-50 iron-nickel alloy called "Sendelta" as the core for the high-frequency coil 34. This kind of magnetic core has a very high initial permeability, and a high pulse voltage will be induced in the coil associated therewith.

When a low-pressure vapor discharge lamp of the cold-cathode type is used, a sufficient pulse voltage to effect ignition can be obtained even if the capacitance of the capacitor 32 is as samll as $0.1\mu F$ or less. For a high-pressure vapor discharge lamp, however, it is necessary to increase the capacitance to about $3\mu F$ to $9\mu F$. However, if such a large capacitor is used for the circuit of FIG. 2(B), a large input current is required for the starting operation, and this is likely to cause an abnormal oscillation. Therefore, the requirements listed below have to be satisfied.

First, it is necessary to provide sufficient power for the pulse during the starting operation. At the same time, the internal impedance of the starting circuit must be sufficiently low at the instant the pulse is generated. Specifically, since the impedance of a high-pressure type lamp is substantially lower than that of a low-pressure type lamp, it is desirable that the internal impedance of the starting circuit also be low.

Secondly, the input current must be small at starting time. Since the impedance of the choke coil 12 for high-pressure type lamps is very low in comparison with that for the low-pressure type, several amperes of current flow at starting time in the circuit shown in FIG. 2(B). If so, the capacities of the coil 34 and thyristor 31 must be large.

Further, the capacitance of the capacitor 32 must be less than $0.1\mu F$ or else the capacitor must be effectively removed from the circuit after the completion of lamp ignition. Sometimes, an abnormally high voltage occurs instantaneously during the period in which the tube voltage (effective value) may be increasing gradually after starting of the lamp. This voltage is amplified by the parallel capacitor to bring about an abnormal oscillation. If the capacitor is about $0.5\mu F$, it is easy to design the coil 34 to obtain a sufficient voltage for lamp starting.

Figure 3C:
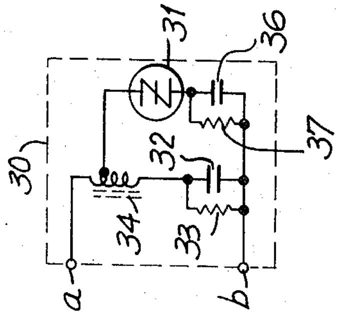
FIGS. 3(A), (B) and (C) are schematic diagrams of modifications of the starting circuit in FIG. 2(B), wherein a second thyristor or capacitor is added for preventing abnormal oscillation and for increasing the reliability of the starting circuit.
Figure 3B:
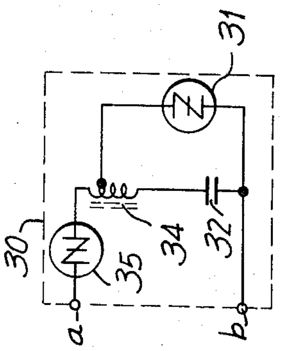
Figure 3A:
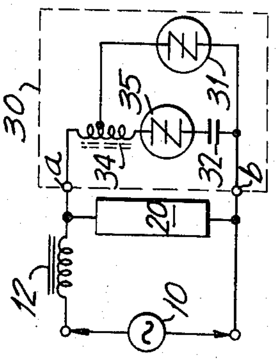

The above requirements will be satisfied by the embodiments in FIGS. 3(A) to 4(C). As shown in FIG. 3(A), a second switching element, such as thyristor 35, is connected in series with the capacitor 32. In this arrangement, the second thyristor 35 is actuated by the voltage of the power source 10, and the capacitor 32 is charged through the same. Subsequently, the first thyristor 31 having a larger operating voltage $V_{bo}$ than that of the second thyristor 35 is operated according to the voltage across the capacitor 32. In this operation, when the second thyristor 35 becomes non-conducting, there remains a certain charge in the capacitor 32. In other words, a voltage having a certain specific polarity remains across the capacitor 32. Thus, the capacitor 32 is rapidly charged and discharged so that a high pulse voltage of both polarities is induced in the coil 34. Current flows into the starting circuit 30 for a very short period from the time at which the second thyristor 35 starts operation to the time at which the first thyristor 31 operates. The current phase of the second thyristor 35 is about $\pi/2$ ahead of the voltage phase. Consequently, the current of the starting circuit during its initial operation can be about one-fifth that of th circuit in FIG. 2(B).

Further, since the second thyristor 35 becomes non-conducting during the normal operation of the discharge lamp 20, capacitor 32 is effectively removed from the operating circuit at such time.

FIG. 3(B) shows another embodiment, wherein the second thyristor 35 is connected in series with the starting circuit 30. This arrangement gives the substantially same effect as the arrangement in FIG. 3(A).

FIG. 3(C) shows still another embodiment, wherein a second capacitor 36 for supplying sufficient starting current and also for decreasing current through the thyristor 31 is used for place of the second thyristor 35 of the above-mentioned embodiments. The first capacitor 32, for example, has a value of about $0.2\mu F$, and the second capacitor 36 has a value of about $9\mu F$. Capacitor 36 is connected in series with the thyristor 31. In this circuit, when the first capacitor 32 is charged due to the power source voltage and then the thyristor 31 is actuated by the voltage across the first capacitor 32, the second capacitor 36 starts to charge and discharge rapidly whereby a sufficient starting power can be obtained.

Elements 33 and 37 are discharge resistors whose resistances are about 50 kΩ. The purpose of these resistors is to rapidly discharge the first and second capacitors 32 and 36 because of the comparatively lower resistance thereof and also to maintain the no charging state of these capacitors. Thus, abnormal oscillation due to instantaneous external pulses can be prevented. The second capacitor 36 can also be connected in series with starting circuit 30 as an addition to or a substitution for the circuit shown in FIG. 3(C).

Figure 4C:
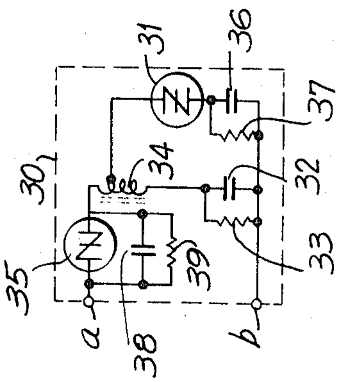
FIGS. 4(A), (B) and (C) show modifications of the starting circuit wherein a leakage-transformer type of operation system is employed to operate the discharge lamp in leading-phase.
Figure 4B:
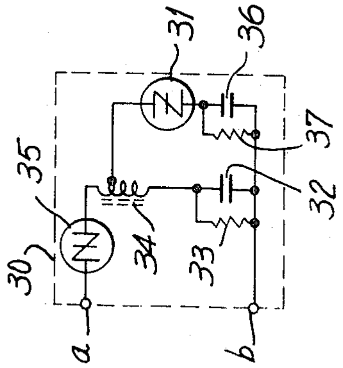
Figure 4A:
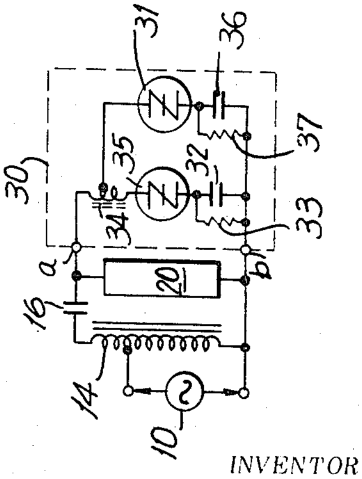

FIGS. 4(A), (B) and (C) are combinations of the embodiments mentioned hereinbefore, in which a constant-power operation system is employed. In FIG. 4(A), the circuit diagram for a high-pressure discharge lamp 20 of the cold-cathode type comprises a power source 10, a leakage-transformer 14, a leading-phase condenser 16 in series with the lamp 20, and a starting circuit 30 connected in parallel with the lamp 20. The starting circuit 30 is a combination of the embodiments of FIG. 3(A) and FIG. 3(C).

The further embodiment of FIG. 4(B) is a combination of the embodiments of FIG. 3(B) and FIG. 3(C).

The embodiment of FIG. 4(C) is a modification of that of FIG. 4(B). In FIG. 4(C), a parallel circuit having a capacitor 38 and a resistor 39 is connected across the second thyristor 35. In this circuit, the second thyristor 35 hardly turns on against the external pulse so abnormal oscillation is prevented. The parallel circuit arrangement is also applicable to the first thyristor 31.

It is also desirable that when a resistor such as one of 50 kΩ is connected in parallel with the thyristor 31 to make it possible to flow current therethrough, the current variation factor *di/dt* with respect to external pulses can be reduced in comparison with the arrangement wherein the thyristor 31 is independently used. Thus, the thyristor conducts at a relatively low level in response to external pulses.

Figure 7:
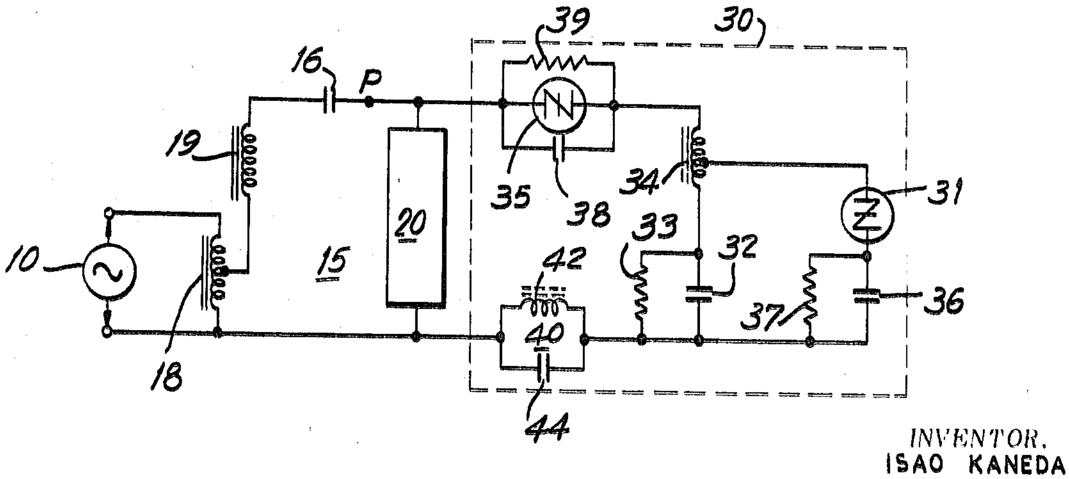
FIG. 7 illustrates a modification of the embodiment in FIG. 5 wherein a constant-power operation system is employed.

Considering next metal-halide discharge lamps, these are favorably regarded because of good color rendition and high efficiency. However, these lamps sometimes fail due to abnormal oscillation or erroneous operation of the associated starting circuit if the peak of the lamp tube voltage is raised instantaneously. With respect to this problem, it has been found that a band-pass filter circuit can be useful and can be added to the above-mentioned embodiments. Circuit diagrams of the improvement are illustrated in FIGS. 5 and 7.

Figure 5:
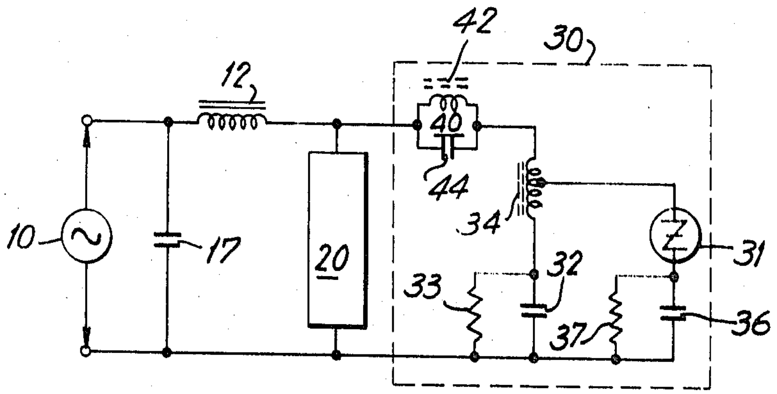
FIG. 5 illustrates an embodiment using a band-pass filter circuit.

In the embodiment of FIG. 5, a band-pass filter (as shown in FIG. 1(C) ) is used instead of the parallel circuit consisting of a thyristor 35, capacitor 38 and resistor 39 shown in FIG. 4(C).

Figure 6A:
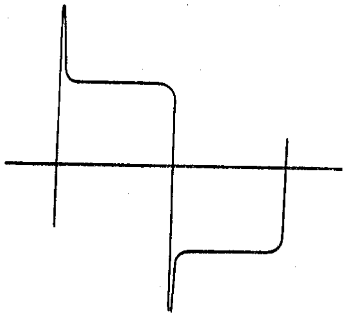
FIGS. 6(A) and (B) show wave-forms of terminal voltages appearing in the first thyristor at the initial time of starting operation for purposes of explanation of the embodiment in FIG. 5.

This circuit for lamp operation employs a high-power factor or P.F. correction operating system which comprises the a.c. source 10, the current limiting device or choke-coil 12, the electric discharge lamp 20, a phase advancing capacitor 17 for power-factor correction and noise prevention connection in parallel with the a.c. source 10, and the starting device 30 connected in parallel with the lamp 20. The starting circuit or device 30 includes thyristor 32, high-frequency coil 34 having a core, for example, of 50-50 iron-nickel magnetic material to provide a relatively high operational quality Q, first and second capacitors 32 and 36 with discharge resistors 33 and 37 respectively, and a band-pass filter 40. The filter 40 is designed to pass a relatively low-frequency component of th power source 10, such as, for example, 50 or 60 Hz and to suppress a relatively higher frequency, such as, for example several kHz, appearing in the rising or peak portion of th wave-form of the terminal voltage, as shown in FIG. 6(A), which appears between the terminals of the thyristor 31 after the lamp is ignited. However, the frequency of the pulse voltage generated by the starting circuit device 30 will be passed without substantial elimination.

A simplest form of band-pass filter 40 can be a parallel circuit consisting of a coil 42 and a capaictor 44 as shown in FIG. 5 in which the distributed capacitance of the coil 42 may be utilized as the capacitor 44.

In the operation of this embodiment, the terminal voltage of the capacitor 32 is brought to an instantaneous value of 90 percent or more of the source voltage which passes the filter 40. Accordingly, a thyristor 31, whose operating voltage or break-over voltage $V_{bo}$ is set above 90 percent of the source voltage, will conduct, and the charge of the capacitor 32 will be rapidly discharged through circuit elements 32-34-31-36-32. Thus, a high pulse voltage, which is applied to the discharge lamp 20 through the filter 40, is induced in the high frequency coil 34 due to a large change rate (*di/dt*) of the current, so that the discharge lamp 20 will be lighted.

Figure 6B:
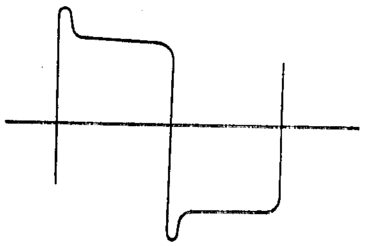

In the conventional operation of a metal-halide discharge lamp, in which the temperature of the lamp rises to an order of about 200°C, the wave-form of th lamp tube voltage has a very high peak value in the rise portion as shown in FIG. 6(A). However, the filter 40 improves the wave-form of the terminal voltage such that the peak value is decreased and the peak width is broadened by about 10 times as shown in FIG. 6(B) by reason of the fact that the sudden charging of the capacitor 32 at arc extinction in the discharge lamp is stopped by the coil 42 and that the discharging of the capacitor 32 through the lamp 20 at a re-ignition thereof is also suppressed. This prevents erroneous operation of the starting device.

When the lamp voltage is very high, the starting circuit or device 30 can be operated by conduction of the thyristor 31 but the coil 42 of the filter 40 acts as a ballast against the pulse voltage generated by the starting circuit or device 30. That is to say, the total impedance in the starting circuit becomes somewhat larger due to the existence of the coil 42, and the discharge lamp 20 will not be short-circuited by the starting circuit or device 30.

Further, when the discharge lamp is in stable condition, the operation is maintained stable by decreasing the lamp voltage. Even if an external pulse is applied across the discharge lamp 20, the starting circuit 30 will not operate erroneously due to the action of the filter 40.

A modification of a constant-power operating system is shown in FIG. 7, wherein is employed a current ballast or stabilizer 15 which includes a primary coil 18 and a secondary coil 9. A phase-advancing capacitor 16 is connected in series with the lamp 20. Since the capacitor 16 increases the peak value of the lamp tube voltage, a switching means, which comprises second thyristor 35, capacitor 38 and resistor 39 connected in parallel, is added to the starting circuit device 30.

In the operation, since the induced voltage of the secondary coil 19 is increased *n* times that of the primary coil 18, the operating voltage of the second thyristor 35 is set for 90 percent, or less, of that voltage, and 90 percent or more to 180 percent or less for the first thyristor 31. Accordingly, the pead value of the voltage is increased, and the operating voltage of the first thyristor 31 can be increased. In this case, an excellent effect is obtained by using the filter 40, and there is no turning-off of the discharge lamp nor flickering of the light.

Also, when the pulse voltage (peak value) necessary for starting reaches 3,000 V, there arises a problem of withstanding voltage of the ballast. However, such a high voltage can be isolated by the inserting of a high-frequency inductor for suppressing pulse voltage at point P shown in FIG. 7.

In the above-mentioned embodiments, same inconveniences are encountered when the same are applied to a discharge lamp having an auxiliary electrode. For example, when a discharge lamp such as a metal-halide vapor discharge lamp is cut off from the electric source due to some cause while in normal operation, the discharge lamp goes out and even if the power source is restored immediately, the discharge lamp will not start again under this condition because of the high-pressure of vapor in the arc tube. When this vapor pressure decreases gradually with lapse of time, a glow discharge takes place with respect to the auxiliary electrode. In an ordinary starting device, the glow discharge takes place between the main and auxiliary electrodes about several minutes after the lamp turns off and then the main arc discharge can be established between the main electrodes immediately. However, with the starting circuit employing the high pulse voltage, a glow discharge is produced when the vapor pressure does not decrease sufficiently, for instance after about three minutes, and it does not shift to an arc discharge because of the high vapor pressure still existing. Such glow discharge may produce heat, the vapor pressure increases again, and finally the glow discharge also stops. However, when the vapor pressure of the arc tube decreases due to the stopping of the glow discharge, the glow discharge starts again. Such operation is repeated successively, and the discharge lamp will not again start permanently or the lamp is not restarted until after a considerable time. As a result, damage of the electrode is severe and the life thereof becomes very short. This phenomenon occurs in the initial starting of such discharge lamps.

In order to avoid this problem, the following points are to be considered. Namely, for a starting of a discharge lamp filled with a metal halide, there are required certain values and a relationship between the instantaneous voltage and the instantaneous current. For example, with a 400-watt discharge lamp, when it is not equipped with an auxiliary electrode, the necessary instantaneous voltage is about 3,000 V; but, when the lamp is equipped with an auxiliary electrode, th restarting becomes difficult with a high pulse voltage as described above, so that a decrease in the instantaneous voltage and an increase in the instantaneous current are necessary. For example, the instantaneous voltage is set at about 800 V, while the value of the capacitor 36 for supplying current is increased from $0.5\mu F$ with no auxiliary electrode to $13\mu F$. With this method, however, the parts constituting the device become large and the starting effect is somewhat worse.

Figure 8:
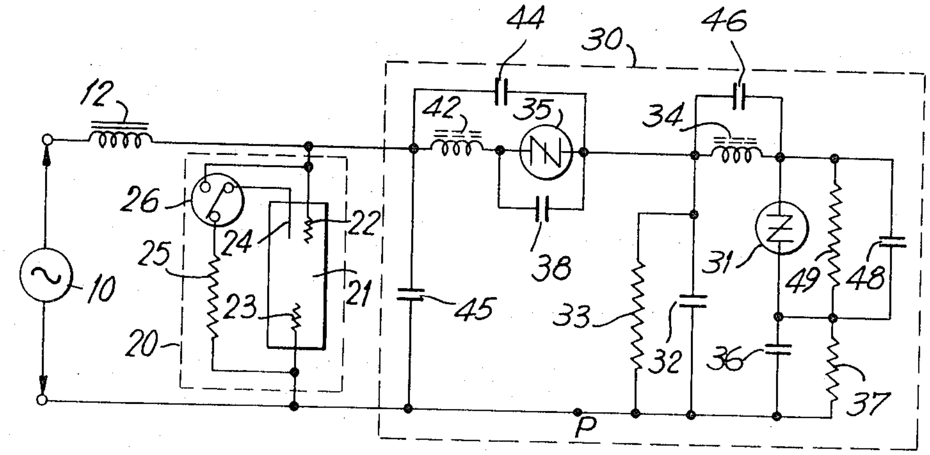
FIG. 8 is a schematic diagram for a discharge lamp having an auxiliary electrode.

An improvement of the re-starting characteristic is achieved by a circuit arrangement characterized by at least one second thyristor which connects a closed oscillation-generating circuit to a discharge lamp with an auxiliary electrode as shown in FIG. 8.

In FIG. 8, there is the a.c. source 10, choke coil 12 acting as a current limiting means which also may be a leakage-transformer, discharge lamp 20 with an auxiliary electrode, and starting circuit 30. The discharge lamp 20 includes an arc tube 21 containing metal halides, a pair of main electrodes 22 and 23, and an auxiliary starting electrode 24 adjacent one of the main electrodes 22. A starting resistor 25 is connected between the electrodes through a switching element 26 which opens the starting resistor 25 during normal operation and brings the voltage of the auxiliary electrode 24 to a magnitude equal to that of the main electrode 22. This switching element 26 is preferably a bimetallic switch responsive to the temperature of the arc tube 21.

Figure 9A:
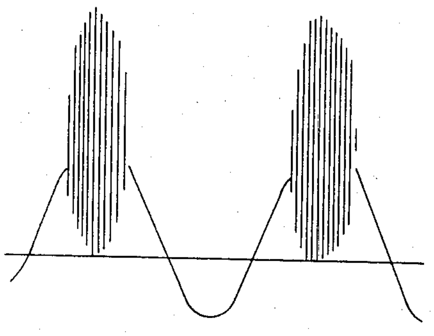
FIGS. 9(A) and (B) show wave-forms of the output voltage for purposes of explanation of the circuit diagram in FIG. 8.

The starting circuit 30 comrises a closed circuit including capacitor 32, non-linear inductance coil 34 having a ferrite core, and first thyristor 31 which is so designed as to produce an oscillating voltage such as shown in FIG. 9(A). Capacitor 36 for supplying additive current is connected in series with the thyristor 31, and discharge resistors 33 and 37 are connected in parallel with the capacitors 32 and 36 as previously shown in FIG. 3(C). Second voltage responsive switching element or thyristor 35 whose operating voltage or breakover voltage $V_{bo}$ is less than the peak value of the source voltage and is higher than the arc tube voltage of the lamp 20 is connected between the lamp 20 and the above-mentioned closed circuit.

In this arrangement, the first thyristor 31 is operated by the terminal voltage of the capacitor 32, and its operating voltage is set to be about twice that of the second thyristor 35. When the source voltage is applied across the discharge lamp 20 and at the same time to the second thyristor 35 by the capacitor 32, it conducts instantaneously, and the capacitor 32 is charged. Since the thyristor 35 has operating voltages not quite identical for both directions generally, the capacitor 32 is charged nearly up to the source voltage. On the other hand, the voltage wave-form at the terminals of the capacitor 32 becomes asymmetrical, for positive and negative polarities, as if a d.c. voltage equal to the source voltage were to be superposed thereon by both the voltages of the capacitor 32 and the power source 10, and the peak value of the terminal voltage of the capacitor 32 becomes about twice that of the source voltage. Thus, when the terminal voltage of the capacitor 32 reaches the operating voltage of the first thyristor 31, it conducts and the charge in the capacitor 32 discharges rapidly in the closed circuit through elements 32-34-31-36-32. At this moment, the polarity of the capacitor 32 is reversed, and a superposed voltage of a high frequency oscillating voltage, as shown in FIG. 9(A), is applied to the discharge lamp 20, and the discharge lamp is started.

When the discharge lamp 20 is turned off by opening of the power source 10 due to some cause during operation, the discharge lamp 20 will not start again although the starting device is actuated, because of the high temperature of the arc tube of the discharge lamp 20 which leads to a high pressure of the vapor of the filling materials. With the passing of time, a glow discharge occurs and immediately shifts to a main arc discharge, when the re-starting voltage decreases below the output voltage of the starting circuit 30.

Since the terminal voltage of the discharge lamp 20 decreases during operation, the second thyristor 35 does not operate. When an instantaneous pulse voltage arrives from the outside during the conducting state of the second thyristor 35, the first thyristor 31 will not be caused to operate so that the starting circuit 30 will not operate erroneously and the discharge lamp 20 operates stably.

In this way, when a voltage in an oscillating condition is applied to the discharge lamp, the instantaneous current at starting is not necessarily large even if the peak-value of the applied voltage itself is rather low, so that the capacity of the capacitor 36 can be a practical value which is remarkably small compared with that of the pulse-generating circuit shown in FIG. 5, and yet difficulty in re-starting can be eliminated completely.

This embodiment can be modified in such manner that a parallel circuit, for decreasing the current through the first thyristor 31, which consists of capacitor 36 and discharge resistor 37 can be connected to the point P. In this embodiment, an inductance element 42 for supressing external pulses from impulses by lightening or the like and for preventing erroneous operation of the second thyristor 35 is connected between the lamp 20 and the closed circuit. This element 42 is designed to allow the passage of the voltage generated in the starting circuit itself. Further, capacitors 38, 44 and 45 are added for preventing the erroneous operation of the starting circuit 30 all of which have values which are small. The capacitor 45 may improve the starting characteristic at low temperature. These capacitors may be used with discharge resistors connected in parallel.

A capacitor 46 for changing equivalent inductance of the high frequency coil 34 is connected in parallel with the coil 34 in order to lower the oscillation voltage. It is also possible to limit the oscillation by providing taps on the high frequency coil 34. A resistor 49 for regulating the starting voltage of the starting circuit 30 is connected to the first thyristor 31 (the operating voltage increases with this value). This also increases the operational quality Q of the starting circuit 30, and the oscillation is made stable and intensified.

Figure 9B:
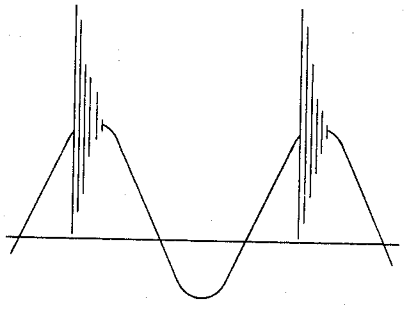
Figure 10:
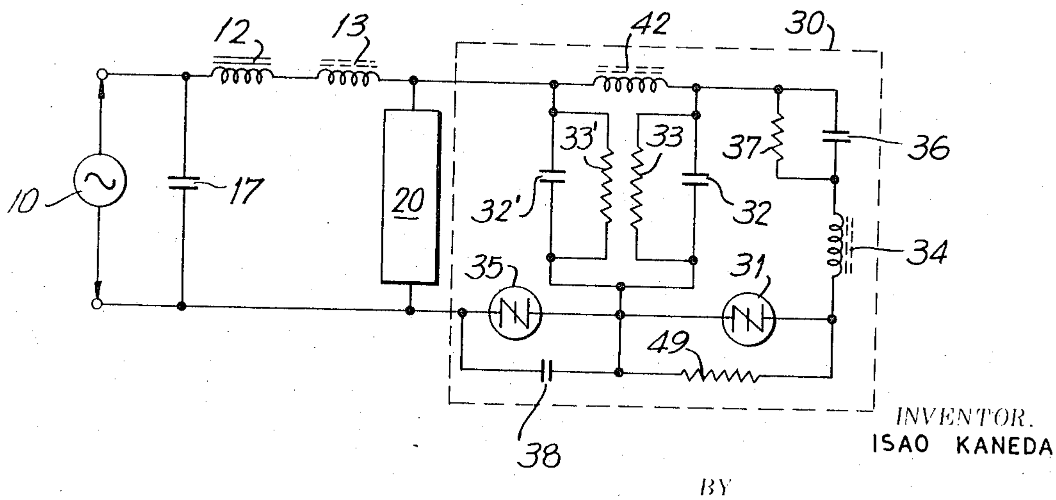
FIG. 10 illustrates another preferred embodiment in the form of a starting circuit for a metal-halide discharge lamp.

Element 48 is a capacitor having a small capacity for increasing the oscillation frequency as well as for changing the wave-form of the output voltage of the starting device into a damped oscillatory form, as shown in FIG. 9B, so as to limit the oscillating period. It also stabilizes the operating voltage of the starting device particularly at the lower side for stabilizing the oscillation. The reason is that the oscillating condition of the starting circuit is changed by the action of the terminal voltage of capacitor 48. $\pi$-type, T-type, L-type or other types of low band-pass filters may be constituted together with the capacitor 32 or high frequency coil 34 as shown in FIG. 10. In this way, erroneous operation of the starting device due to internal or external surge voltages such as caused by lightening can be prevented. By suppressing the oscillation frequency at starting below a certain value, noise may be prevented. These additional circuits can selectively be used individually or in combination.

A modification is also illustrated in FIG. 10 wherein the first and second thyristors are provided with a common junction. Thus, these thyristors can be mounted on a common plate with a cooling fin which radiates heat generated by operation of these thyristors. By using the common plate, more compact and efficient starting circuit devices can be manufactured.

In tests using a starting circuit 30 combined with a metal-halide discharge lamp with an auxiliary electrode, the following values of circuit elements were used.

Power source 10 was an a.c. source of 200 V and 60 Hz. Choke coil 12 (as a current ballast) inductance was 0.5 mH. High-frequency inductor 13 for protection of the choke-coil had an inductance of 200$\mu$H at 1 kHz.

Power-factor correction capacitor 17 had a capacitance of 20$\mu$ F. Discharge lamp 20 was a 400-watt metal halide containing discharge lamp with an auxiliary electrode. First thyristor 31 was a bidirectional diode thyristor having an operating voltage $V_{bo}$ in the range of 250 to 300 V. Second thyristor 35 was a bidirectional diode thyristor haivng an operating voltage $V_{bo}$ in the range of 180 to 250 V. Capacitors 32 and 32' for the oscillation circuit, L C resonant circuit and band-pass filter circuit each had a capacitance of 0.1 $\mu$F.

Discharge resistors 33 and 33' for capacitors 32 and 32' each had resistances of 50 k$\Omega$ and were the 2-watt type. Inductor 34 for the oscillating closed circuit had an inductance of 15 mH in unsaturated state. Inductor 42 for the band-pass filter of $\pi$-shaped type had an inductance of 15 mH in unsatruated state. Capacitor 36 for supplying an additive starting current and for decreasing the current through the first thyristor 49 had a capacitance of 3$\mu$F. Discharge resistor 37 for capacitor 36 had a resistance of 100 k$\Omega$ and was of 1-watt type. Resistor 49 for obtaining stable oscillation had a resistance of 100 k$\Omega$ and was of 1-watt type, Capacitor 38 for passing external pulses had a capacitance of 3,000 pF.

This device described above, according to the present invention, decreases the output voltage of the starting circuit arrangement and is capable of supplying sufficient current by means of oscillation, so that it can restart positively a discharge lamp containing a metal halide and provided with an auxiliary electrode.

What is claimed is:

1. A circuit for operating a cold-cathode discharge lamp, said circuit comprising a power source and a capacitor coupled in closed circuit relationship, said lamp being coupled across said power source; and an inductor, a further capacitor and a first bidirectional diode thyristor coupled with the first said capacitor in a second closed circuit relationship; and a second bidirectional diode thyristor coupled between said inductor and said lamp and power source, said second thyristor being included in the first said closed circuit, said second thyristor having a lower break-over voltage than said first thyristor; said first said capacitor being charged through said second bidirectional diode thyristor to the instantaneous value of the power source and discharged by the first said bidirectional diode thyristor through said inductor to produce a high voltage which is applied to said lamp to ignite the same.

2. A circuit as claimed in claim 1, wherein the inductor of said second closed circuit includes a coil and core of magnetic material of square hysteresis characteristics.

3. A circuit as claimed in claim 1, wherein said inductor is a non-linear saturable inductor which includes a coil and a core of ferrite.

4. A circuit as claimed in claim 1, including for each of the first said and further capacitors a parallel resistor for the discharging of said capacitors.

5. A circuit as claimed in claim 1 comprising a band-pass filter consisting essentially of an inductance and capacitance, said filter being connected between the first said capacitor and power source.

6. A circuit as claimed in claim 1 comprising a capacitor and a resistor connected across said second thyristor.

* * * * *